(12) United States Patent
Commeyne et al.

(10) Patent No.: US 11,715,311 B1
(45) Date of Patent: Aug. 1, 2023

(54) TRANSFORMATION MATCHING IN OPTICAL RECOGNITION

(71) Applicant: GENETEC INC., Saint-Laurent (CA)

(72) Inventors: Christophe Commeyne, Montréal (CA); Tahir Ali Khan, Saint-Laurent (CA)

(73) Assignee: GENETEC INC, St-Laurent (CA)

( * ) Notice: Subject to any disclaimer, the term of this patent is extended or adjusted under 35 U.S.C. 154(b) by 336 days.

(21) Appl. No.: 17/082,528

(22) Filed: Oct. 28, 2020

(51) Int. Cl.
```
G06V 30/18      (2022.01)
G06F 16/583     (2019.01)
G06V 20/62      (2022.01)
G06F 16/535     (2019.01)
G06F 18/22      (2023.01)
G06F 18/10      (2023.01)
G06V 30/12      (2022.01)
```

(52) U.S. Cl.
CPC ...... *G06V 30/18019* (2022.01); *G06F 16/535* (2019.01); *G06F 16/5846* (2019.01); *G06F 18/10* (2023.01); *G06F 18/22* (2023.01); *G06V 20/625* (2022.01); *G06V 30/133* (2022.01)

(58) Field of Classification Search
None
See application file for complete search history.

(56) References Cited

U.S. PATENT DOCUMENTS

2015/0052161 A1* 2/2015 Boyko ............... G06F 40/157
707/756

FOREIGN PATENT DOCUMENTS

EP 2565804 B1 * 10/2018 ....... G06F 17/30256

* cited by examiner

*Primary Examiner* — Bernard Krasnic
(74) *Attorney, Agent, or Firm* — Norton Rose Fulbright Canada

(57) ABSTRACT

The present disclosure provides methods and systems for performing licence plate matching. A reference list comprising licence plate identifiers is obtained. At least one transformation rule is applied to the licence plate identifiers of the reference list to generate entries forming at least one augmented reference list, and storing the at least one augmented reference list in at least one database. A search request comprising an input licence plate identifier is obtained. The at least one transformation rule is applied to the input licence plate identifier to generate a search list comprising at least one search term. The at least one database is queried with the search list to identify a match between at least one of the entries of the at least one augmented reference list and the at least one search term of the search list. A signal responsive is output to identifying the match.

20 Claims, 10 Drawing Sheets

TRANSFORMATION MATCHING IN OPTICAL RECOGNITION

TECHNICAL FIELD

The improvements generally relate to the field of optical detection.

BACKGROUND

Computer-based optical recognition has applications in a number of different fields. One application of computer-based optical recognition is in licence plate surveillance: cameras are used to capture images of licence plates of vehicles, as they move along a road or when the vehicles are stationary. The images captured by the cameras are processed to extract a textual representation of the licence plate identifier, which can then be used to search a list of licence plates of interest, or can be logged to indicate the passage of the vehicle at a particular point and at a particular time.

Various existing approaches for licence plate surveillance exist, and remain suitable for their purposes. Nevertheless, improvements remain desirable.

SUMMARY

In accordance with one aspect, there is provided a method for performing licence plate matching. A reference list comprising licence plate identifiers is obtained. At least one transformation rule is applied to the licence plate identifiers of the reference list to generate entries forming at least one augmented reference list, and storing the at least one augmented reference list in at least one database. A search request comprising an input licence plate identifier is obtained. The at least one transformation rule is applied to the input licence plate identifier to generate a search list comprising at least one search term. The at least one database is queried with the search list to identify a match between at least one of the entries of the at least one augmented reference list and the at least one search term of the search list. A signal responsive is output to identifying the match.

In at least some embodiments, applying the at least one transformation rule to the licence plate identifiers of the reference list to generate entries comprises, for each of the licence plate identifiers in the reference list: generating a subset entry by removing a first character from each licence plate identifier; and generating at least one additional subset entry by removing a second character from each licence plate identifier, the second character at a different position within each licence plate identifier than that of the first character; and wherein the subset entry and the at least one additional subset entry form part of the at least one augmented reference list.

In at least some embodiments, generating the at least one additional subset entry by removing the second character from each licence plate identifier is repeated for each different position of the second character within each licence plate identifier.

In at least some embodiments, applying the at least one transformation rule to the licence plate identifiers of the reference list to generate entries comprises, for each of the licence plate identifiers in the reference list: generating a subset entry by removing a first group of characters from the licence plate identifier; and generating at least one additional subset entry by removing a second group of characters from the licence plate identifier, the second group of characters different from the first group of characters; wherein the subset entry and the at least one additional subset entry form part of the at least one augmented reference list.

In at least some embodiments, applying the at least one transformation rule to the licence plate identifiers of the reference list to generate entries comprises replacing confusable characters in the licence plate identifiers with associated substitute characters.

In at least some embodiments, replacing confusable characters in the licence plate identifiers with associated substitute characters comprises selecting a set of the confusable characters and the associated substitute characters based on a language of the licence plate identifiers and/or based on a jurisdiction of the licence plate identifiers.

In at least some embodiments, applying the at least one transformation rule to the input licence plate identifier of the search request to generate the at least one search term of the search list comprises, for each of the licence plate identifiers of the search request: generating a subset search term by removing a first character from each input licence plate identifier; and generating at least one additional subset search term by removing a second character from each input licence plate identifier, the second character at a different position within each licence plate identifier than that of the first character; and wherein the subset entry and the at least one additional subset entry form part of the search list.

In at least some embodiments, generating the at least one additional subset search term by removing the second character from each input licence plate identifier is repeated for each different position of the second character within each input licence plate identifier.

In at least some embodiments, applying the at least one transformation rule to the input licence plate identifier of the search request to generate the at least one search term of the search list comprises, for each of the input licence plate identifiers in the search request: generating a subset search term by removing a first group of characters from the input licence plate identifier; and generating at least one additional subset search term by removing a second group of characters from the input licence plate identifier, the second group of characters different from the first group of characters; wherein the subset search term and the at least one additional subset search term form part of the at least one search list.

In at least some embodiments, applying the at least one transformation rule to the input licence plate identifier of the search request to generate the at least one search term of the search list comprises replacing confusable characters in the input licence plate identifiers with associated substitute characters.

In at least some embodiments, replacing the confusable characters in the input licence plate identifiers with the associated substitute characters comprises selecting a set of the confusable characters and the associated substitute characters based on a language of the input licence plate identifiers and/or based on a jurisdiction of the input licence plate identifiers.

In at least some embodiments, storing the at least one augmented reference list in the at least one database comprises sorting the entries within the at least one augmented reference list.

In at least some embodiments, storing the at least one augmented reference list in the at least one database comprises linking the entries of the at least one augmented reference list with metadata.

In at least some embodiments, linking the entries of the at least one augmented reference list with metadata comprises linking each of the entries with a respective one of the licence plate identifiers used to generate the entries.

In at least some embodiments, linking the entries of the at least one augmented reference list with metadata comprises linking each of the entries with vehicle information of a vehicle associated with a respective one of the licence plate identifiers used to generate the entries.

In at least some embodiments, linking the entries of the at least one augmented reference list with metadata comprises linking each of the entries with a jurisdiction identifier associated with a respective one of the licence plate identifiers used to generate the entries.

In at least some embodiments, outputting the signal responsive to identifying the match comprises outputting a licence plate image associated with the request.

In at least some embodiments, outputting the signal responsive to identifying the match comprises outputting a contextual image associated with the request, the contextual image comprising the licence plate image.

In at least some embodiments, storing the at least one augmented reference list in the at least one database comprises incorporating the licence plate identifiers of the reference list as part of the at least one augmented reference list, and wherein the search list comprises the input licence plate identifier.

In at least some embodiments; outputting a signal responsive to identifying the match comprises outputting a first indication responsive to identifying a first match between the input licence plate identifier and one of the licence plate identifiers; and outputting a second indication responsive to identifying a second match between one of the at least one search terms and one of the entries of the at least one augmented reference list.

In at least some embodiments, the method comprises obtaining a supplemental reference list comprising at least one supplemental licence plate identifier; applying the at least one transformation rule to the at least one supplemental licence plate identifier to generate at least one supplemental entry; and storing the at least one supplemental entry in the at least one database as part of the at least one augmented reference list.

In at least some embodiments, storing the at least one augmented reference list in the at least one database comprises storing the at least one augmented reference list in a cloud repository.

In at least some embodiments, querying the at least one database with the search list comprises: splitting the search list into a plurality of search sub-lists, each search sub-list comprising at least one of the at least one search term; and querying the cloud repository with the plurality of search sub-lists in parallel.

In at least some embodiments, applying the at least one transformation rule to the licence plate identifiers of the reference list comprises generating a set of permutations for each of the licence plate identifiers of the reference list, wherein the set of permutations associated with a particular licence plate identifier of the licence plate identifiers of the reference list is comprised of modifications of the particular licence plate identifier, each having one character at a respective position of the particular licence plate identifier removed; wherein the set of permutations for each of the licence plate identifiers of the reference list form part of the at least one augmented reference list; and wherein applying the at least one transformation rule to the input licence plate identifier comprises generating a subsequent set of permutations comprised of modifications of the input licence plate identifier, each having one character at a respective position of the input licence plate identifier removed, the subsequent set of permutations forming part of the search list.

In accordance with another aspect, there is provided a system for performing licence plate matching. The system comprises at least one processing unit and at least one non-transitory computer-readable medium. The at least one non-transitory computer-readable medium has stored thereon program instruction which are executable by the at least one processing unit for: obtaining a reference list comprising licence plate identifiers; applying at least one transformation rule to the licence plate identifiers of the reference list to generate entries forming at least one augmented reference list, and storing the at least one augmented reference list in at least one database; obtaining a search request comprising an input licence plate identifier; applying the at least one transformation rule to the input licence plate identifier to generate a search list comprising at least one search term; querying the at least one database with the search list to identify a match between at least one of the entries of the at least one augmented reference list and the at least one search term of the search list; and outputting a signal responsive to identifying the match.

In accordance with a further broad aspect, there is provided a non-transitory computer-readable medium. The non-transitory computer-readable medium has stored thereon program instruction which are executable by a processing unit for: obtaining a reference list comprising licence plate identifiers; applying at least one transformation rule to the licence plate identifiers of the reference list to generate entries forming at least one augmented reference list, and storing the at least one augmented reference list in at least one database; obtaining a search request comprising an input licence plate identifier; applying the at least one transformation rule to the input licence plate identifier to generate a search list comprising at least one search term; querying the at least one database with the search list to identify a match between at least one of the entries of the at least one augmented reference list and the at least one search term of the search list; and outputting a signal responsive to identifying the match.

Many further features and combinations thereof concerning embodiments described herein will appear to those skilled in the art following a reading of the instant disclosure.

DETAILED DESCRIPTION

Figure 1:
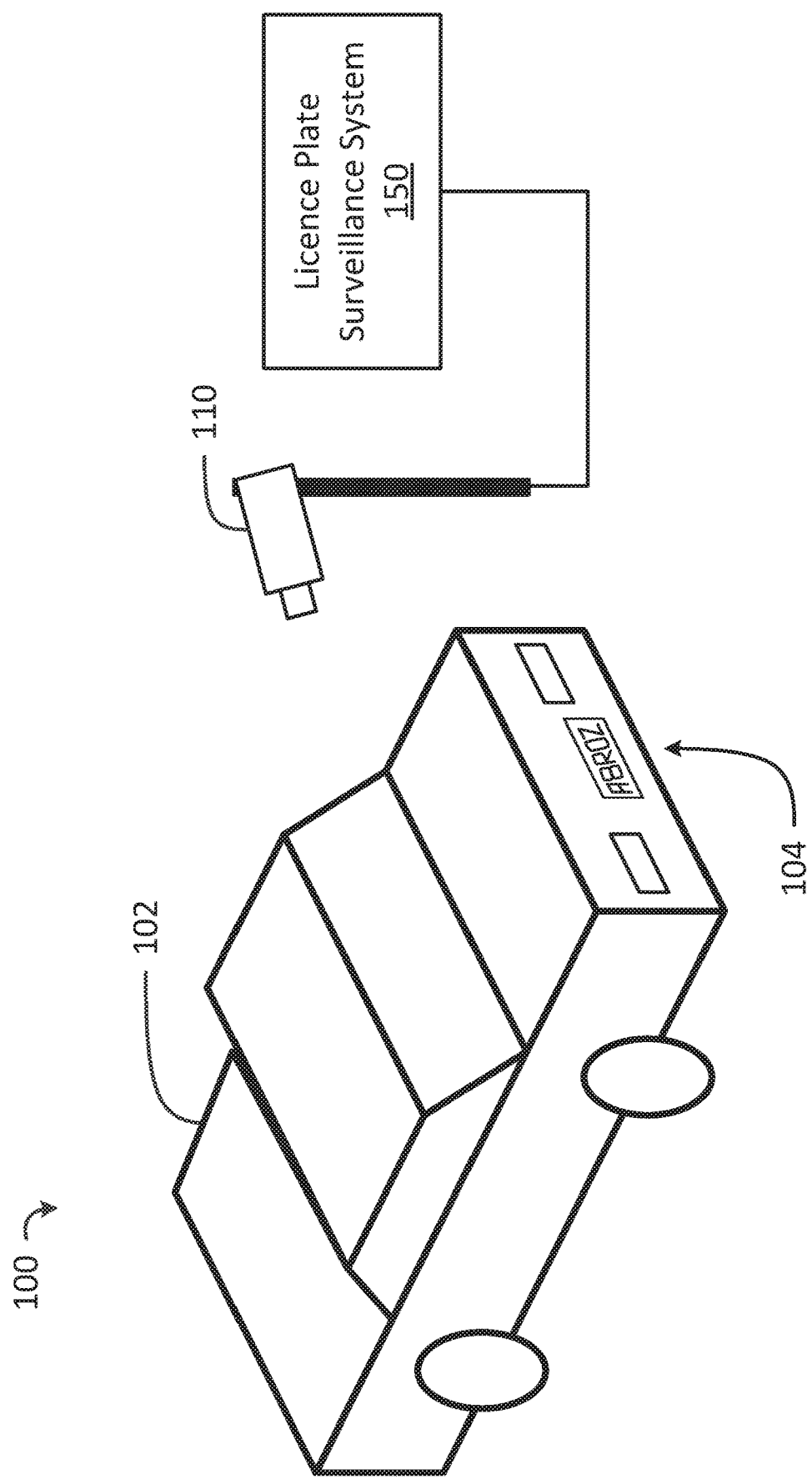
FIG. 1 illustrates an example licence plate surveillance scenario.

With reference to FIG. 1, there is illustrated an example licence plate surveillance scenario 100. A vehicle 102, which could be a car, a truck, or any other type of automobile, is equipped with a licence plate 104. In the embodiment illustrated in FIG. 1, the licence plate 104 is affixed to a rear bumper portion of the vehicle 102, thought it should be noted that the techniques described herein are applicable in cases where the vehicle 102 has its licence plate 104 affixed to a front bumper portion of the vehicle 102, or to any other suitable portion of the vehicle 102. In certain situations, the vehicle 102 may be located in a field of view of a camera 110, which is configured for capturing images of licence plates, including the licence plate 104. In some cases, the camera 110 may be located proximate to a roadway, and the vehicle 102 enters and exits the field of view of the camera 110 as the vehicle 110 moves along the roadway. In some other cases, the camera 110 may be located in a parking lot or other location where the vehicle 102 may be stopped, and the vehicle 102 may be located in the field of view of one or more cameras 110 while in the parking lot. Still other possible locations for the camera 110 are considered.

Upon capturing one or more images of the licence plate 104, the camera 110 provides the images(s) to an external system, illustrated here as an automated licence plate recognition (ALPR) system 150. The ALPR system 150 may compare the licence plate identifier of the licence plate 104 ('A8R0Z' in the illustrated example) to one or more lists of licence plate identifiers stored within or otherwise accessible by the ALPR system 150 to determine whether the licence plate identifier matches any of the licence plate identifiers on the lists. The license plate identifier may comprise any suitable combination of alphanumerical characters (i.e., letters and/or numbers) and/or other symbols. The license plate identifier may be commonly known as a "license plate number", although it is typically not limited to numbers. The license plate identifier may be referred to as "vehicle registration identifier". The ALPR system 150 may use this information in a variety of contexts. For example, the ALPR system 150 may be monitoring the passage of vehicles along a predetermined roadway to identify a particular vehicle having a particular licence plate, identified as being a vehicle of interest in a law enforcement operation. In another example, the ALPR system 150 may be used for parking enforcement. For example, the ALPR system 150 may be used for monitoring the entry of vehicles to a parking lot or other private location for the purposes of billing the owners of the vehicles for their entry, or to determine whether unauthorized vehicles have entered the private location, Other applications are also considered.

In some embodiments, the camera 110 configured for automatically capturing one or more images of the licence plate 104 of the vehicle 102 as the vehicle 102 passes through the field of view of the camera 110. Various suitable techniques for detecting the presence of the vehicle 102, the location of the licence plate 104, and the like, can be applied. In some other embodiments, the camera 110 is coupled to a separate detector which issues a command to the camera 110 to capture one or more images. The separate detector may be collocated with the camera 110, may be disposed within the roadway being travelled by the vehicle 102, or may be at any other suitable location. For example, the detector may be collocated with a parking gate which controls access to a parking lot. When the detector determines that a vehicle is at the parking gate, the detector may signal to the camera 110 to capture one or more images. The images captured may be colour images, black-and-white images, infrared images, or any other suitable type of image.

The camera 110 may be coupled to the ALPR system 150 over any suitable type of communication channel, which may include one or more wired connections and/or one or more wireless connections, as appropriate. For instance, one or more cellular channels may couple the ALPR system 150 to the camera 110. In some embodiments, the camera 110 provides the ALPR system 150 with an image of the licence plate 104, and optionally with an image which includes part or all of the vehicle 102, a background within the field of view of the camera 110, and other suitable visual information. For instance, the ALPR system 150 can be provided with a first image of the licence plate 104, and a second image, sometimes referred to as a contextual image or a context image, which includes part or all of the vehicle 104.

In some other embodiments, the camera 110 is configured for performing one or more image processing steps on the captured images. For instance, the camera 110 can perform optical character recognition (OCR) on the captured images to generate a textual string for the licence plate 104 which contains, in a textual format, the licence plate identifier for the licence plate 104. For example, the camera 110 may perform OCR on the licence plate 104 to produce the textual string 'A8R0Z', which can be provided to the ALPR system 150 by the camera 110. In some further embodiments, the camera 110 may perform other image processing steps, for instance assessing a colour, a make, and/or model of the vehicle 102, identifying the presence of defects or other markings on the vehicle 102, and the like. The results of the image processing performed by the camera 110 can be transmitted to the ALPR system 150 as contextual data. It should be noted that in some other embodiments, some or all of the image processing steps may be performed in whole or in part by the ALPR system 150. In one example, the camera 110 is configured for performing OCR on the licence plate 104 and transmit the textual string to the ALPR system 150 along with one or more images, and the ALPR system 150 is configured for processing the image(s) to determine the colour, make, and/or model of the vehicle 102. Other approaches are also considered.

The camera 110 may vary depending on implementation. For example, the camera 110 may be implemented with a camera unit. The camera unit may comprise one or more optical sensors, one or more processors, computer-readable memory and/or storage, and one or more input and/or output interfaces. The camera unit may be coupled to the ALPR system 150 over any suitable type of communication channel, which may include one or more wired connections and/or one or more wireless connections. By way of another example, the camera 110 may be implemented with a camera unit and an external computing device coupled to the camera unit over any suitable type of communication channel, which may include one or more wired connections and/or one or more wireless connections. The external computing device may comprise one or more processors, computer readable memory and/or storage, and one or more input and/or output interfaces. The external computing device may be coupled to the ALPR system 150 over any suitable type of communication channel, which may include one or more wired connections and/or one or more wireless connections. The external computing device may be configured to control the camera unit in order to command the camera unit to capture one or more images. The external computing device may be configured to receive image(s) from the camera unit. The external computing device may be configured to process the image(s) to generate a textual string for the licence plate 104. The external computing device may be configured to communicate the captured image(s) of the licence plate 104 and/or the textual string for the licence plate 104 to the ALPR system 150. In some embodiments, one external computing device may be coupled to a plurality of camera units, either directly or indirectly via one or more intermediate elements. The camera 110 may be a mobile camera or may be installed a fixed location. In accordance with a specific and non-limiting example, the camera 110 may be implemented according to the teachings of US Patent Application Publication Number US 2018/0350229, the contents of which are hereby incorporated by reference. The camera 110 may be the AutoVu SharpV™ camera and/or AutoVu SharpZ3™ camera provided by Genetec™.

It should additionally be noted that while the embodiments and examples described herein relate primarily to licence plate surveillance, the methods, systems, and other techniques contained within the present disclosure can be applied to other fields where computer vision systems are used to read any suitable identifier of text and/or symbols for searching purposes. For instance, the techniques described herein could be applied to reading barcodes or other optical codes on moving objects, such as packages. Accordingly, the term "license plate identifier" may be interchanged with the term "identifier" in the various examples and embodiments described herein, in order to provide these other implementations.

Figure 2A:
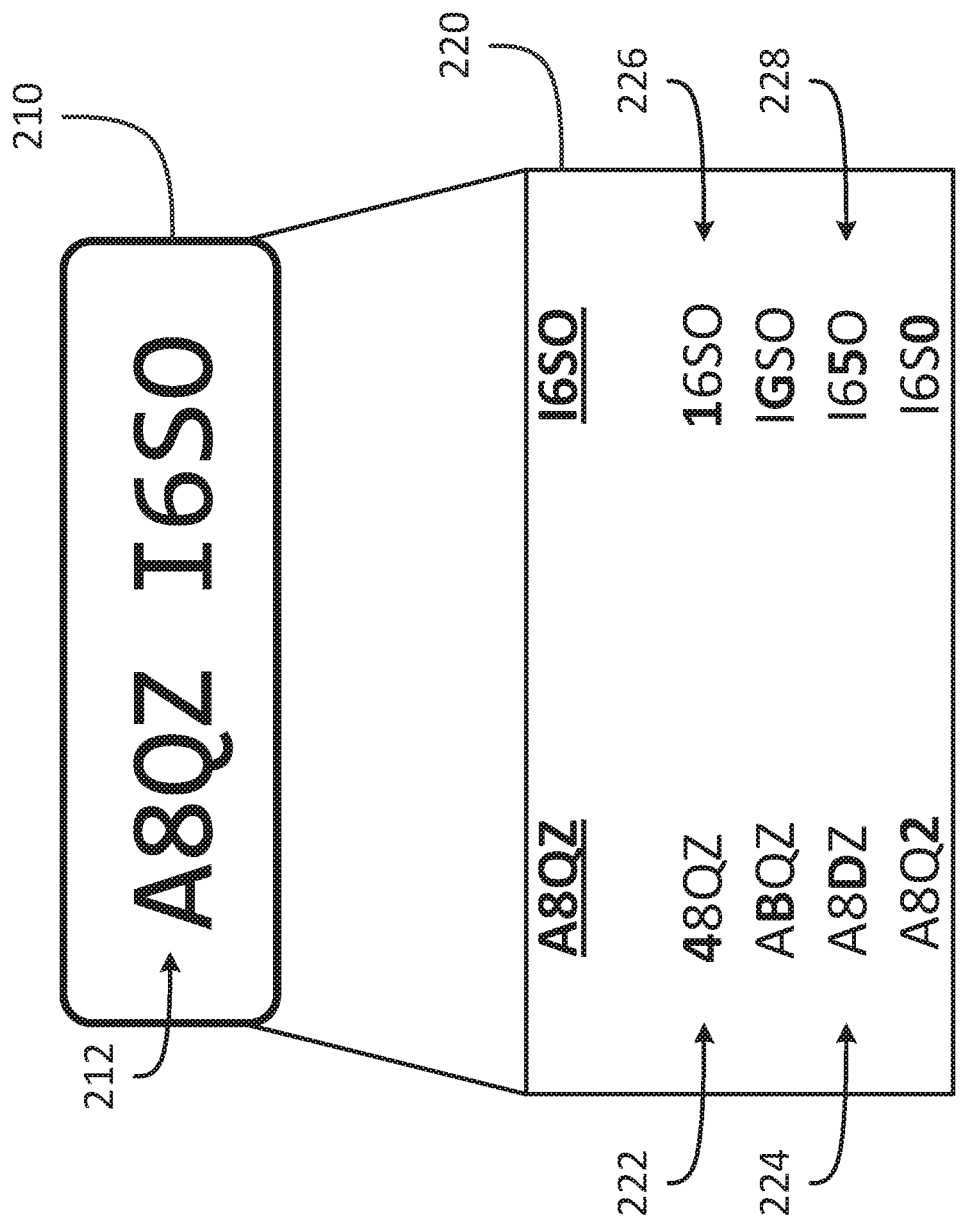
FIG. 2A illustrates an example licence plate and example optical character recognition values.

With reference to FIG. 2A, and as discussed hereinabove, image processing steps, including OCR steps, can produce erroneous results in certain circumstances. FIG. 2 illustrates an example licence plate 210, which has an eight-character identifier 'A8QZ I6SO', identified at 212. One cause of erroneous results in OCR steps is the presence of confusable characters in a licence plate identifier. As illustrated by the example OCR readings 220, some or all of the characters in the identifier 212 of the licence plate 210 may be confused for other characters when OCR is performed, Some non-limiting examples are presented in FIG. 2. At 222, the character 'A' may be confused for the character '4', At 224; the character 'O' may be being confused for the character At 226, the character 'I' may be confused for the character '1'. At 228, the character 'S' may be confused for the character '5'. Other examples of confusable characters are illustrated in FIG. 2, and it should be understood that the examples discussed herein and in FIG. 2 are examples, and other potential confusable characters exist. For instance the character 'Q' confused for 'D' at 224 may also be confused for 'O', '0' or other similar characters.

Figure 2B:
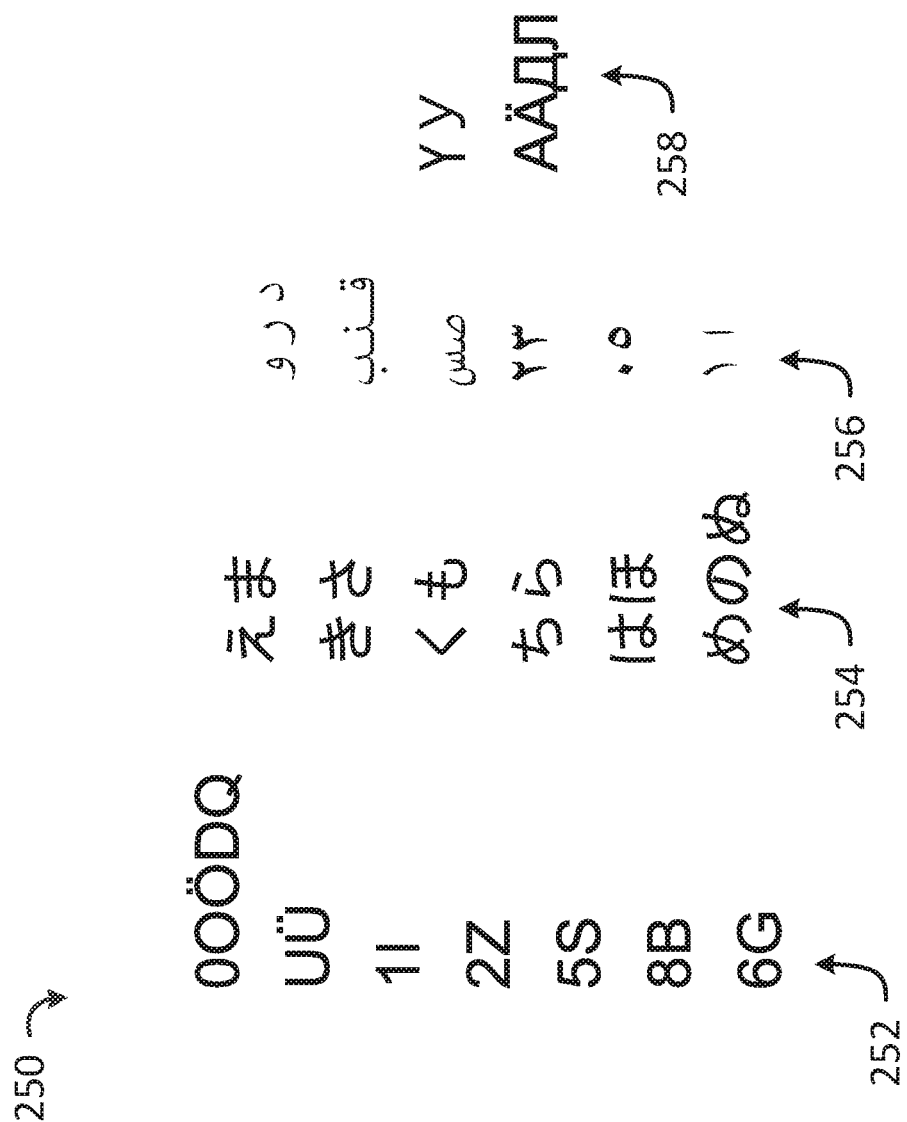
FIG. 2B illustrates example confusable characters.

With additional reference to FIG. 2B, the types of characters which constitute confusable characters will vary based on the language or alphabet from which the characters are sourced. In FIG. 28, characters 250 are arranged in columns 252, 254, 256, and 258 with different examples of confusable characters associated with different languages or alphabets. The column 252 indicates rows of confusable Latin-derived characters and numerical characters. For instance, the characters '0', 'O', 'Ö', 'D', and 'Q' may be confused for one another. Similarly, the characters '1' and 'I' may be confused for one another, as may the characters '8' and 'B'. The column 254 indicates rows of confusable Japanese characters, the column 256 indicates rows of confusable Arabic characters, and the column 258 indicates rows of confusable Cyrillic characters. For example, Japanese characters 'ち' and 'ら' may be confused for one another. In another example, Arabic characters '٢' and '٣' may be confused for one another.

Additionally, different fonts or typesets used for the identifier 212 of the licence plate 210 will result in different confusable characters. The ALPR system 150 may be provided with one or more lists of confusable characters which may be associated with a particular language or alphabet, particular fonts or typesets, and/or with a particular jurisdiction. For example, the ALPR system 150 is provided with one or more lists of confusable characters, which may be associated with particular jurisdictions or licence plate groups, with particular languages, with particular fonts, or the like. The ALPR system 150 may also be provided with lists of substitute characters associated with the confusable characters. For instance, the ALPR system 150 is communicatively coupled to cameras 110 which are located near a border between two jurisdictions. The ALPR system 150, and/or the cameras 110, are configured for determining an originating jurisdiction for licence plates 210 present in the captured image by the cameras 110. The ALPR system 150 and/or the cameras 110 may then select one or more lists of confusable characters based on the determined originating jurisdiction, and the list(s) may be used as part of further processing of the licence plate identifiers 212 of the licence plates 210.

Various causes of erroneous results in OCR steps exist. Movement of the vehicle 102 may result in poor focus of the camera, or improperly-timed image capture, which may result in blurry or otherwise poor-quality images. The presence of debris on the licence plate 210, for example dirt, mud, snow, or the like, may also obscure part or all of the licence plate 210, such that captured images of the licence plate 210 are difficult to process. As a result, it may occur that a particular licence plate 210 is misread by the camera 110 and/or the ALPR system 150. Cases where a licence plate 210 is misread may result in improperly identifying a particular vehicle 102 as a vehicle of interest, or conversely, in failing to identify the particular vehicle 102 as a vehicle of interest. The present disclosure provides methods and systems for performing licence plate matching which, in some embodiments, may address at least some of the aforementioned issues.

With reference to FIG. 3, there is illustrated an embodiment of the ALPR system 150, which is configured for performing licence plate matching. In this embodiment, the ALPR system 150 is composed of a transformation module 310, a query module 320, and a data store 330. The ALPR system 150 is communicatively coupled to the camera 110—though it should be noted that the ALPR system 150 may be coupled to multiple cameras 110—and to a controller 302. The controller 302 may be implemented using any suitable computing device (e.g., workstation, desktop computer, laptop computer, mobile computing device, mobile phone, tablet, etc.), and serves to control, at least in part, the operation of the ALPR system 150. For instance, the controller 302 is operated by an operator associated with the ALPR system 150, and is configured for receiving input(s) from the operator. The controller 302 translates the input(s) from the operator into commands for the ALPR system 150, and can additionally receive information from the ALPR system 150 for display to the operator via the controller 302. To this end, the controller 302 may be provided with one or more input devices (keyboard, mouse or other pointing device, stylus, touch screen, etc.) and one or more output devices (speakers, screen or other display device, etc.) to allow the operator to interact with the ALPR system 150. In some embodiments, the ALPR system 150 is additionally communicatively coupled to an external database 340.

The ALPR system 150 is provided with a reference list 304 which contains one or more licence plate identifiers 212 of interest; that is to say, the licence plate identifier(s) 212 of one or more licence plate(s) 210 that are associated with vehicles 102 which are of interest. The reference list 304 may be provided to the ALPR system 150 by the controller 302, which may receive the reference list 304 from the aforementioned operator, or may receive the reference list 304 from another source external to the ALPR system 150 and the controller 302, for instance the external database 340. In some embodiments, the licence plate identifiers 212 may be for vehicles 102 wanted in conjunction with law enforcement operations, with municipal or jurisdictional operations, or the like. In these embodiments, the ALPR system 150 is concerned with locating one or more particular vehicles 102 having licence plates with licence plate identifiers 212 included on the reference list 304. In some other embodiments, the licence plate identifiers 212 may be for vehicles 102 having a particular authorization to enter a location or to travel on a particular roadway. In these embodiments, the ALPR system 150 is concerned with identifying whether vehicles 102 in images captured by the camera 110 have licence plates with licence plate identifiers 212 included on the reference list 304, and additionally with cataloguing the licence plate identifiers 212 not included on the reference list 304. The reference list 304 may contain any suitable number of licence plate identifiers, which may be listed therein in any suitable format.

The reference list 304 is obtained by the transformation module 310, which applies one or more transformation rules to the licence plate identifiers of the reference list 304 to generate entries which form one or more augmented reference lists 312. The augmented reference list(s) 312 are then stored in a database or other data storage repository, for instance in the data store 330. In some embodiments, the augmented reference list 312 additionally includes the licence plate identifiers 212 themselves, as provided in the reference list 304—that is to say, the augmented reference list 312 may include both untransformed licence plate identifiers and licence plate identifiers transformed by the transformation module 310. It should be noted that multiple reference lists 304 may be provided to the ALPR system 150. In some embodiments, the transformation module 310 applies the same transformation rules to each received reference list 304 to generate subsequent entries. The subsequent entries may be stored as part of the existing augmented reference lists 312, or may be stored in separate augmented reference lists 312 within the data store 330.

In some embodiments, the transformation module 310 is configured for sorting the entries of the augmented reference list 312. For instance, the entries may be sorted alphabetically, or in accordance with another predetermined order, for instance to facilitate searching of the augmented reference list 312, Once the augmented reference list 312 is sorted, updating of the augmented reference list 312, for instance to incorporate one or more additional reference lists 304, may be facilitated, Sorting of the entries of the augmented reference list 312 may also facilitate identification of duplicate values formed through the transformation module 310. Duplicate values may then be removed from the augmented reference list 312 in order to reduce the amount of storage space required to store the augmented reference list 312, or to facilitate searching through the augmented reference list 312. In some other embodiments, the transformation module 310 may produce multiple augmented reference lists 312 using one reference list 304. For example, the transformation module 310 may produce different augmented reference lists 312 for different jurisdictions of licence plates having identifiers present in the reference list 304. If the transformation module 310 is provided with a reference list 304 which includes licence plate identifiers 212 for licence plates 210 from three different jurisdictions, the transformation module 310 can produce three different augmented reference lists 312, each associated with a respective one of the three jurisdictions. In another example, the transformation module 310 produces different augmented reference lists 312 for different vehicle colours, or for different versions or release years of the licence plates 210. Other approaches are also considered.

The transformation module 310 may include additional information in the augmented reference list(s) 312. For instance, the transformation module 310 may obtain various metadata relating to the licence plate identifiers 212 in the reference list 304. The metadata may be provided with the reference list 304 provided by the controller 302, or may be acquired by the transformation module 310 from the database 340. For example, the entries in the augmented reference list 312 are linked with metadata which indicates the licence plate identifier 212 which was used to generate the entries. Thus, if a particular entry of the augmented reference list 312 was generated using the licence plate identifier 'A8R0Z', the metadata for the particular entry includes the textual string 'A8R0Z'. In another example, the entries in the augmented reference list 312 are linked with metadata which indicates vehicle information of the vehicle associated with the licence plate identifier 212 which was used to generate the entries. Using the example of FIG. 1, if a particular entry of the augmented reference list 312 was generated using the licence plate identifier 'A8R0Z' of the vehicle 102, the metadata for the particular entry may include a colour of the vehicle 102, a make and/or model of the vehicle 102, or the like. In a further example, the entries in the augmented reference list 312 are linked with metadata which indicates a jurisdiction of the licence plate 210 associated with the licence plate identifier 212. Other types of metadata may also be included in the augmented reference list 312.

Figure 3A:
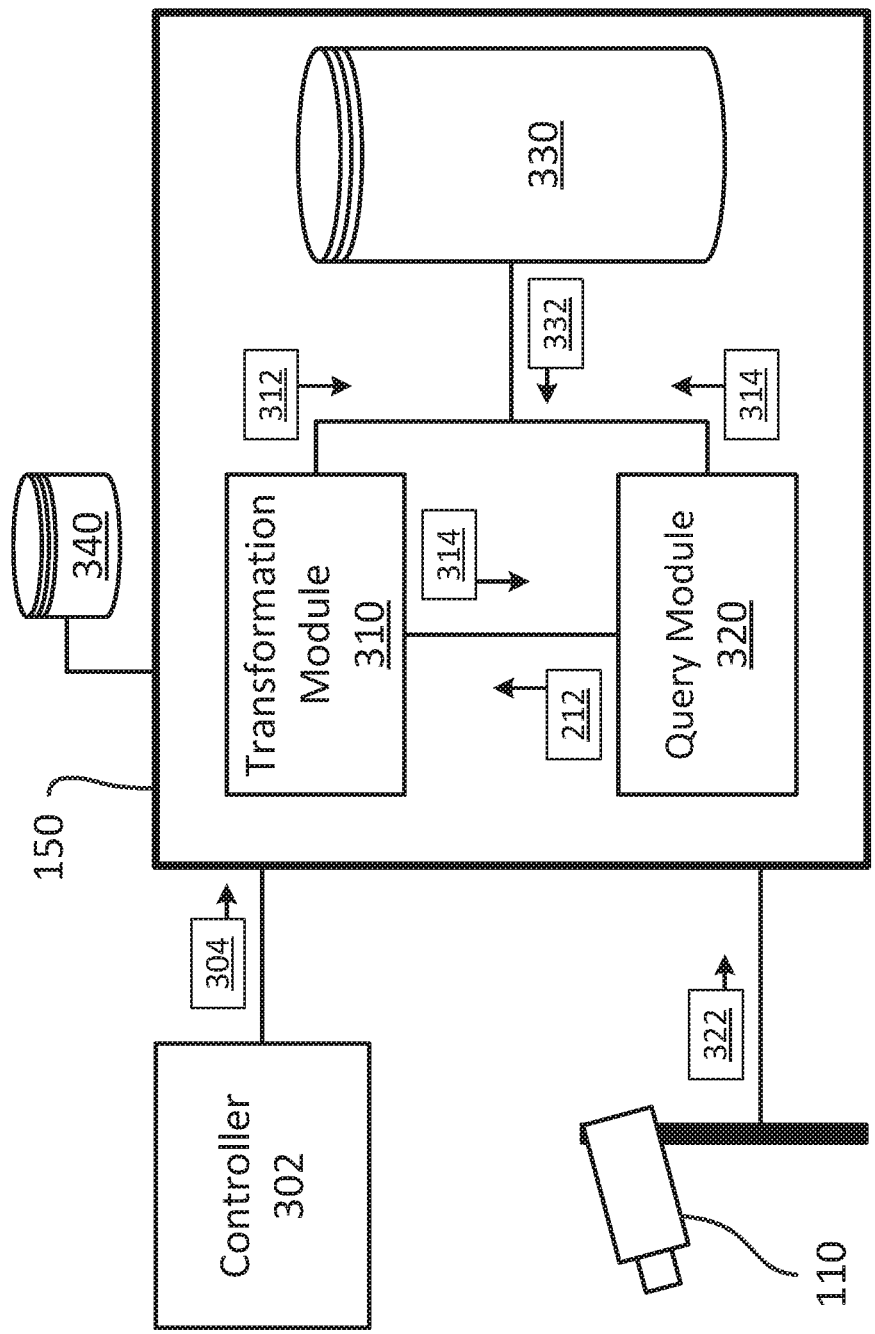
FIG. 3A illustrates an example automated licence plate recognition (ALPR) system.

When the camera 110 captures an image of a licence plate, for instance the licence plate 210, the camera 110 provides one or more images of the licence plate 210, and in some cases a textual string with the licence plate identifier 212, to the ALPR system 150. As illustrated in FIG. 3A, the connection between the camera 110 and the ALPR system 150 may be substantially direct, for instance over one or more wired or wireless networks. In some other embodiments, the camera 110 may be connected to an intermediary system, for instance to which multiple cameras 110 are connected, and the intermediary system is configured for providing the images captured by the cameras 110 to the ALPR system 150. Additionally, the preliminary processing performed outside the ALPR system 150 may be shared between the camera 110 and the intermediary system, as appropriate.

While the present discussion focuses on embodiments in which the camera 110 provides images and/or textual strings to the ALPR system 150, it should be noted that other embodiments are also considered. For example, an intermediary system coupled to one or more cameras 110 may provide images and/or textual strings of licence plate identifiers 212 to the ALPR 150. By way of another example, a separate computing system may have stored therein one or more images and/or textual strings which are provide to the ALPR system 150. By way of a further example, images captured by one or more cameras 110 may be forwarded to human operators for decoding, for instance using the controller 302, and the human operators may produce textual strings for the licence plate identifier 212 which are then provided to the ALPR 150. By way of yet a further example, an operator may enter a text string for the license plate identifier 212 (e.g., without the use of any cameras 110 to capture license plate images), for instance, using the controller 302 or other computing device in communication with the controller 302, which is then provided to the ALPR 150. When an operator enters in a text string for a license plate identifier, a wildcard search may be performed (e.g., the operator enters 'AB*123', where '*' is a wildcard character). The wildcard search may be used, for example, in situations in which the operator or other person witnessed a particular license plate but does not know or remember all of the characters. Other approaches are also considered.

The image(s) and textual string are received by the query module 320 as a search request 322 from the camera 110. In some embodiments, the search request 322 obtained by the query module 320 includes the textual string with the licence plate identifier 212. In cases in which the camera 110 does not provide the query module 320 with the textual string, the query module 320 (or another element of the ALPR system 150) is configured for performing one or more OCR steps to produce the textual string. In some other embodiments, the search request 322 obtained by the query module 320 includes additional information, for instance a time of day at which the camera 110 captured the image of the licence plate 210, a colour, make, and/or model of the vehicle 102, or any other suitable information. Alternatively, the query module 320 may be configured for augmenting the search request 322 with additional information, include the time of day at which the camera 110 captured the image of the licence plate 210, the colour, make, and/or model of the vehicle 102, or the like.

The query module then sends the licence plate identifier 212 for the vehicle 102 concerned by the search request 322 to the transformation module 310. The transformation module 310, upon receiving the licence plate identifier 212 from the query module 310, applies the same transformation rule(s) to the licence plate identifier 212 in the search request 322 as were applied to the licence plate identifier(s) 212 of the reference list 304, thereby producing a search list 314. Alternatively, the ALPR system 150 may comprise two transformation modules 310, one for applying the transformation rule(s) to the license plate identifiers of the reference list 304 to generate the augmented reference list 312 and another for apply the same transformation rule(s) to the licence plate identifier 212 of the search request 322 to generate the search list 314. In embodiments in which the ALPR system 150 includes two transformation modules 310, the transformation modules 310 may be communicatively coupled to one another to ensure that the same transformation rule(s) are applied to the licence plate identifiers of both the reference list 304 and the search request 322. For instance, a first one of the transformation modules 310 is a leader which decides which transformation rule(s) to apply, and a second one of the transformation modules 310 is a follower which receives one or more commands from the first transformation module 310 with instructions on which transformation rule(s) to apply. The search list 314 may have one or more search terms based on the licence plate identifier 212 for the vehicle 102 concerned by the search request 322. The search list 314 is then provided to the query module 320, which queries the data store 330 with the search list 314.

Querying of the data store 330 may be performed using any suitable searching techniques. In embodiments in which the search list 314 contains multiple search terms, the query module 320 may order or sort the search terms of the search list 314 in a predetermined fashion, for instance to accelerate querying of the data store 330, or to prioritize querying of certain search terms over others. The results of the querying of the data store 330, referred to as the query results 332, may be returned to the query module 320, or to another element of the ALPR system 150. The query results 332 may then be passed on to the controller 302, for instance by the query module 320, whereby the operator associated with the ALPR system 150 may review the query results. Alternatively, or in addition, a record of the query results 332 may be stored within the ALPR system 150, for instance within the data store 330, or in an external database, which may be within or otherwise accessible to the controller 302, for instance the database 340.

In some embodiments, the query results 332 are output as a signal from the ALPR system 150 to the controller 302. The query results 332 may be displayed on a display device associated with the controller 302. The query results 332 provided by the ALPR system 150 to the controller 302 may be provided in any suitable format, and may be encrypted depending on the particular implementation of the ALPR system 150 and the controller 302. The query results 332 output by the ALPR system 150 to the controller 302 may include a variety of information. In some embodiments, the query results 332 include a list of matches identified between the search terms of the search list 314 and the entries of the augmented reference list 312. Depending on the transformation rules applied by the transformation module 310 to the reference list 304 and to the licence plate identifier 212 of the search request 322, the matches may be based on transformed versions of the licence plate identifiers 212. The query results 332 may indicate which transformation rules applied by the transformation module 310 resulted in matches between the search terms of the search list 314 and the entries of the augmented reference list 312.

In some embodiments, the query results 332 include various information which were initially provided as part of the search request 322. For example, the query results 332 include one or more of the images originally captured by the camera 110. This may include one or more images of the licence plate 210, and/or one or more contextual images, which may capture part or all of the vehicle 102, the background or vicinity in which the vehicle 102 was captured, and the like. In another example, other contextual information, for instance the time and location at which the images were captured by the camera 110, may be included with the query results 332.

In some embodiments, the controller 302 may receive multiple query results 332 for a single search request 322, or may receive different indications as part of a common query result 332. For instance, a first indication may be provided in the case of a match identified between the licence plate identifier 212 (provided as part of the search request 322) and one of the licence plate identifiers included in the reference list 304, which was incorporated into the augmented reference list 312. A second, separate indication may be provided in the case of a match identified between one of the search terms included in the search list 314, which are transformed versions of the licence plate identifier 212, and one of the transformed licence plate identifiers included as part of the augmented reference list 312. In the case of matches between both untransformed and transformed values, both the first and the second query results 332 described hereinabove may be provided.

Figure 3B:
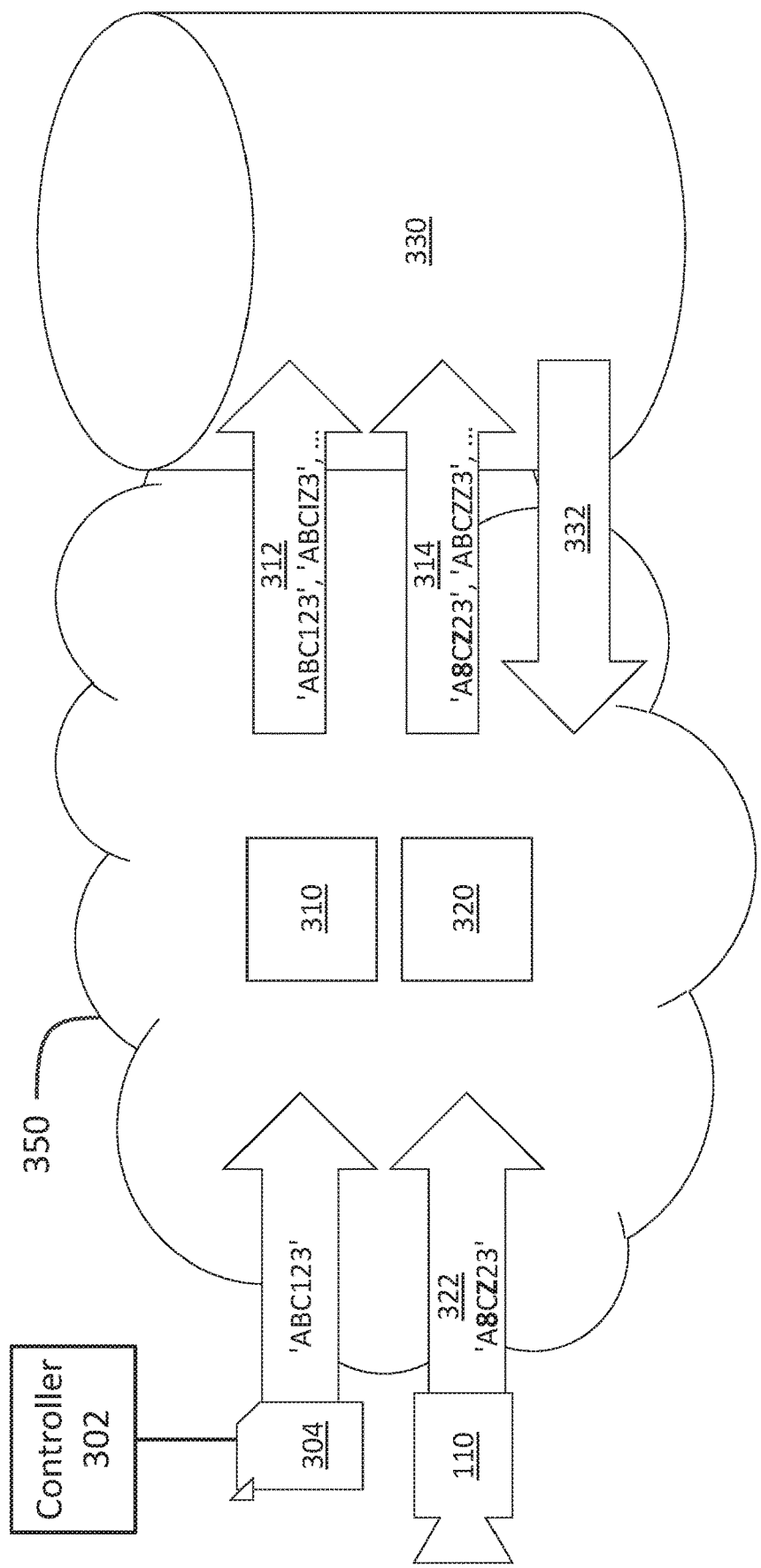
FIG. 3B illustrates an example cloud computing implementation of the ALPR system of FIG. 3A.

With reference to FIG. 3B, part or all of the ALPR system 150 may be implemented in whole or in part as a cloud-computing environment, illustrated at 350. For example, the transformation module 310 and the query module 320 are implemented in the cloud-computing environment 350. The data store 330 may be a cloud-based data store or repository, which may be implemented in any suitable type of cloud-computing environment, including the cloud-computing environment 350. The transformation module 310 may access the data store 330 via an application program interface (API) or similar command structure. In another example, the ALPR system 150 is itself implemented in a cloud-computing environment, and the controller 302 and the camera 110 interact with the ALPR system 150 via a suitable API. When implemented in a cloud-computing environment, the ALPR system 150 may be implemented using a representational state transfer architecture (also known as a RESTful implementation), and may be implemented in a stateless manner. Other approaches are also considered. For instance, the controller 302 may be part of a common system with the ALPR system 150, which may be implemented on a server or other computing device managed by a particular organization.

In one non-limiting example, the reference list 304 includes the licence plate identifier 'ABC123', which is transmitted to the transformation module 310 within the cloud-computing environment 350. The transformation module 310 produces the augmented reference list 312, which includes the entries 'ABC123' (matching the licence plate identifier of the reference list 304), as well as one or more additional entries based on the applied transformation rules, for instance the entry 'ABCIZ3'. When the camera 110 detects a vehicle, the search request 322 is sent from the camera 110; which includes a misread licence plate identifier 'A8CZ23' (in this case, the characters '8' and 'Z' are misread), which may be due to any number of causes. The query module 320 within the cloud-computing environment 350 receives the search request 322 and produces the search list 314, which is used to query the data store 330 within the cloud-computing environment 350. The search list 314 includes one or more search terms, which may include the misread licence plate identifier 'A8CZ23' and one or more transformations thereof, for instance the search term 'ABCZZ3'. The data store 330 then returns query results 332, which may then be provided to one or more elements outside the cloud-computing environment 350, for instance to the controller 302.

Figure 4:
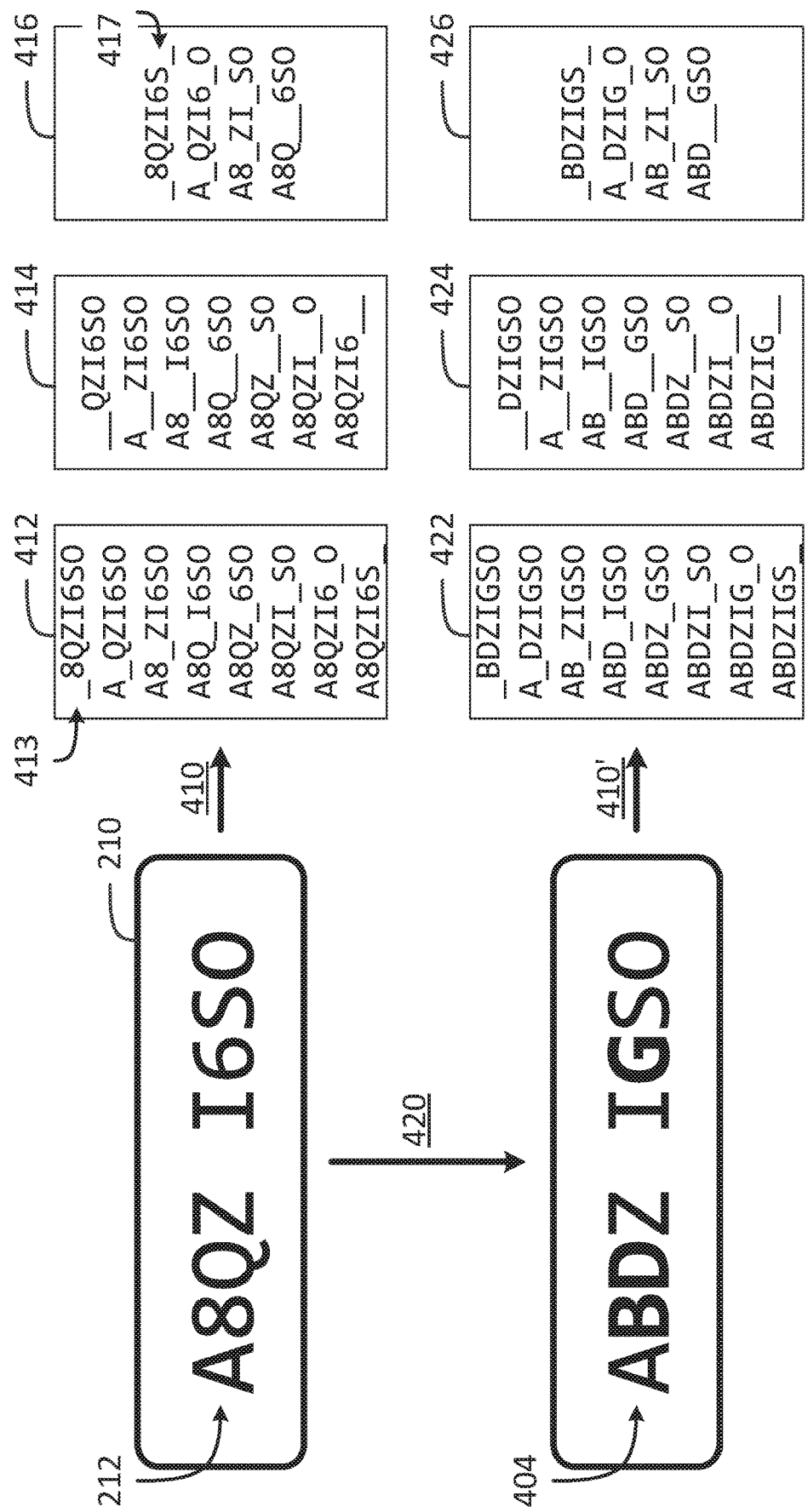
FIG. 4 illustrates example transformed entries based on the example licence plate of FIG. 2.

With additional reference to FIG. 4, the operation of the transformation module 310 is presented in greater detail. The transformation rule(s) applied by the transformation module 310 and discussed herein may result in facilitated and/or accelerated querying of the data store 330. Because the transformation module 310 applies the same transformation rule(s) to both the reference list 304 and to the licence plate identifier 212 included in the search request 322, the query module 320 performs the querying of the data store 330 in a common search space shared by the search list 314 and the augmented reference list 312.

A first transformation rule 410 applied to the licence plate identifier 212 involves creating subset entries 412 based on the licence plate identifier 212. As illustrated here, a first subset entry 413 is created by removing the first character from the licence plate identifier 212. Additional ones of the subset entries 412 are created by removing the second character, the third character, and so on, from the licence plate identifier 212. This process can be repeated by removing one character in sequence from the licence plate identifier 212 for all positions of characters within the licence plate identifier 212. The subset entries 412 may be included as part of the augmented reference list 312. In some cases, the transformation module 310 applies the transformation rule 410 to remove only certain characters from the licence plate identifier 212. For instance, the transformation module 310 may be provided with instructions which indicate certain character positions of the licence plate identifier 212 as being more likely to be incorrectly processed by the camera 110 and/or the ALPR system 150 (for instance due to known shortcomings with the operation of the camera 110 or the like). The transformation module 310 may produce only some of the subset entries 412 based on these instructions.

The transformation rule 410 may be applied to the licence plate identifier 212 to create subset entries 414 and 416 by removing groups of characters from the licence plate identifier 212. The groups of characters may include two characters, or more than two characters, as appropriate. In addition, the groups of characters removed may include groups of contiguous characters, as with subset entries 414, or may include non-contiguous groups, as with subset entries 416. Other patterns for removing characters from the licence plate identifier 212 are also considered. For example, in some embodiments the camera 110 may have a known shortcoming of misreading the end characters of the licence plate identifier 212 (in this example, characters 'A' and 'O' of the licence plate identifier 212). In this example, the transformation module 310 produces the subset entry 417, which is included as one of the entries in the augmented reference list 312. By way of another example, the transformation module 310 produces different permutations of the licence plate identifier 212 resulting from removing any two (or more) characters therefrom. This may involve removing the first character and any one (or more) additional characters, then removing the second character and any one (or more) subsequent additional characters coming after the second character, and repeating these steps in sequence for every additional position. In this fashion, the transformation module 310 may produce all different permutations of the licence plate identifier 212 resulting from removing any two or more characters.

Thus, one type of transformation rule which the transformation module 310 can implement is one in which the licence plate identifier 212 is used to generate a set of permutations which is composed of modifications of the licence plate identifier 212 in which one or more characters at different positions within the licence plate identifier 212 are removed. The characters may be removed sequentially for each position of characters within the licence plate identifier 212, or may be removed selectively in one or more fashions.

Another transformation rule 420 that may be applied to the licence plate identifier 212 involves replacing confusable characters within the licence plate identifier 212 with substitute characters. As illustrated in FIG. 4, the licence plate identifier 212 can be transformed into the substitute licence plate identifier 404, in which the character '8' is replaced with the character 'B', the character 'Q' is replaced with the character 'D', and the character '6' is replaced with the character 'G'. The particular set of confusable characters and associated substitute characters used by the transformation module 310 may vary based on a language associated with the licence plate 210, with a jurisdiction associated with the licence plate 210, or in any other suitable fashion. The application of the transformation rule 420 may produce a standardization of the entries in the augmented reference list 312 and of the search terms in the search list 314, for instance by replacing all numerical characters with alphabetic substitute characters. In this fashion, the common search space shared by the search list 314 and the augmented reference list 312 may be reduced. In some cases, multiple different sets of confusable characters can be used concurrently, and the transformation module 310 can produce multiple different substitute licence plate identifiers 404. In some such embodiments, the query module 314 may query the data store 330 with multiple separate search lists 314, each associated with a respective set of confusable characters and associated substitute characters. It should also be noted that separate sets of confusable characters may be used in cases in which textual strings for the licence plate identifiers 212 are produced by human operators. For instance, a list of confusable characters may be generated based on commonly-produced typographical errors depending on the type of keyboard used or the language in which the textual strings are produced. For example, in the case of a standard English QWERTY keyboard, confusable characters may include 'M' and 'N', which are adjacent to one another.

In some embodiments, multiple transformation rules may be applied in sequence to the licence plate identifier 212. For instance, the transformation rule 410 is applied to produce the substitute licence plate identifier 404, and then an analog to the transformation rule 410, illustrated here as transformation rule 410', is applied to generate one or more sets of subset entries 422, 424, and 426. The subset entries 422 have one character removed from the substitute licence plate identifier 404 at sequential positions, similar to the subset entries 412. The subset entries 424 have two contiguous characters removed at sequential positions, similar to the subset entries 414, and the subset entries 426 have two non-contiguous characters removed, similar to the subset entries 416. In addition, in certain cases the application of transformation rule 410' may consist in a selective application to only certain character positions within the substitute licence plate identifier 404, as appropriate.

In some embodiments, the transformation module 310 may select which transformation rules to apply based on the nature of the licence plate identifiers provided to the transformation module 310. For example, the transformation module 310 may be provided with different predetermined sets of transformation rules and conditions for their application. One set of transformation rules may be associated with licence plates 210 of a first jurisdiction, and another set of transformation rules may be associated with a second, different jurisdiction. When the transformation module 310 receives the reference list 304 and the licence plate identifier 212 associated with the search request 322, the transformation module 310 may also obtain, or otherwise determine, a jurisdiction of the licence plate identifiers 212 to transform, and select a predetermined set of transformation rules to be applied based thereon.

In some embodiments, the transformation module 310 may perform one or more cryptographic transformations on the licence plate identifier(s) 212. For example, the transformation module 310 may encrypt the licence plate identifiers 212 using one or more encryption techniques. Thus, the entries of the augmented reference list 312 and the search terms in the search list 314, including any associated metadata, may be encrypted when they are stored in the data store 330. In this fashion, if an unauthorized entity were to access the data store 330, no plaintext data would be available to the unauthorized entity. In some other embodiments, the encryption of the entries of the augmented reference list 312 and the search terms in the search list 314 may be performed by another element of the ALPR system 150. Additionally, in some embodiments the entries of the augmented reference list 312 and the search terms in the search list 314 may be decrypted at suitable times.

The entries of the at least one augmented reference list 312 may be encrypted with an encryption function (e.g., a homomorphic encryption function), thereby providing at least one encrypted augmented reference list (e.g., at least one homomorphic encrypted augmented reference list). Similarly, the entries of the search list 314 may be encrypted with the same encryption function, thereby providing an encrypted search list (e.g., a homomorphic encrypted search list). In some cases, entries in the encrypted augmented reference list(s) correspond to hashed values of licence plate identifiers 212 and/or hashed values of transformed licence plate identifiers 212 transformed via the application of transformation rule(s). Similarly, entries in the encrypted search list correspond to hashed values of licence plate identifiers 212 and/or hashed values of transformed licence plate identifiers 212 transformed via the application of transformation rule(s). The hashed search terms of the encrypted search list 314 may be compared to the hashed entries of the encrypted augmented reference list(s) 312 to assess matches. When a match is found, the matching encrypted hashed value(s) may be decrypted allowing an operator to see the results. It should be appreciated that by using encryption (e.g., homomorphic encryption) that an additional layer of privacy may be added to the ALPR system 150, as encryption (e.g., homomorphic encryption) may allow for transformations to be made to the encrypted data without requiring prior decryption.

Figure 5A:
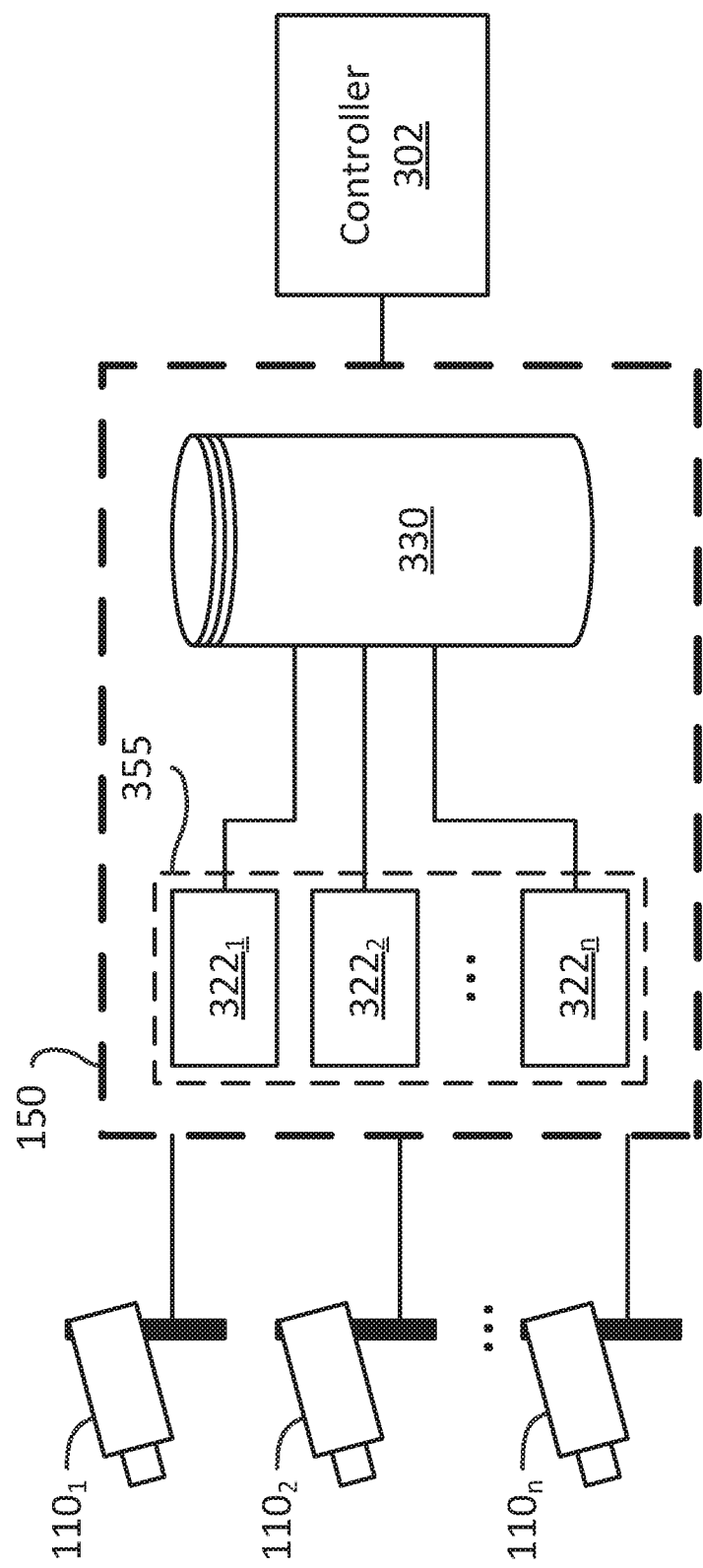
FIG. 5A illustrates an example querying approach for the ALPR system of FIG. 3B.

With reference to FIG. 5A, in some embodiments the ALPR system 150 is configured for receiving and processing multiple search requests 322 in parallel and substantially concurrently. For example, the ALPR system 150 is communicatively coupled to a plurality of cameras 110, illustrated here as cameras $110_1$, $110_2$, . . . , $100_n$ (collectively termed "the cameras 110"). Each of the cameras $110_1$, $110_2$, . . . , $100_n$ may, independently of one another, issue search requests to the ALPR system 150 at any suitable time and any suitable frequency. In the embodiment illustrated in FIG. 5, the camera $110_1$ issues a search request $322_1$, the camera $110_2$ issues a search request $322_2$, and the camera $110_n$ issues a search request 322 (collectively termed "the search requests 322"). When the ALPR system 150 is, in whole or in part, implemented in a cloud-computing environment, the ALPR system 150 may be configured for processing the search requests 322 in parallel and substantially concurrently via a request handler 355. The request handler 355 is implemented as part of the ALPR system 150 and comprises software module(s) and/or element(s) which are responsible for allocating computational resources of the ALPR system 150 to the transformation module 310 and/or the query module 320. For instance, the ALPR system 150 may offer an API or similar command structure via which the cameras 110 send the search requests 322. The ALPR system 150 receives the search requests 322 and the request handler 355 proceeds to allocate resources so that the data store 330, as described hereinabove, may be queried with each of the search requests 322. The computing resources used by the ALPR system 150 may include one or more physical computing devices, one or more virtual machines or other virtual computing resources, or any suitable combination thereof.

In some embodiments, request handler 355 places the search requests 322 in a queue based on a time of receipt thereof by the ALPR system 150. The request handler 355 may operate so that the data store 330 is queried with each of the search request 322 on a first-in, first-out basis. Alternatively, the request handler 355 may operate so that the data store 330 is queried concurrently on the basis of multiple search requests 322. For instance, the request handler 355 may support a number of concurrent queries, each of which is associated with a particular one of the search requests 322. As new search requests 322 are received by the ALPR system 150, the request handler 355 150 assigns the new search requests 322 to available computing resources. If a new search request 322 is received and the currently-allocated computing resources are already occupied, the request handler 355 may then queue the newly-received search request 322, or may allocate (or request allocation of) additional computing resources assign the newly-received search request 322 thereto. In this fashion, the request handler 355 of the ALPR 150 leverages the resources available in the cloud-based environment to dynamically adjust its operation in order to address the number of search requests 322 received. Other approaches are also considered.

Figure 5B:
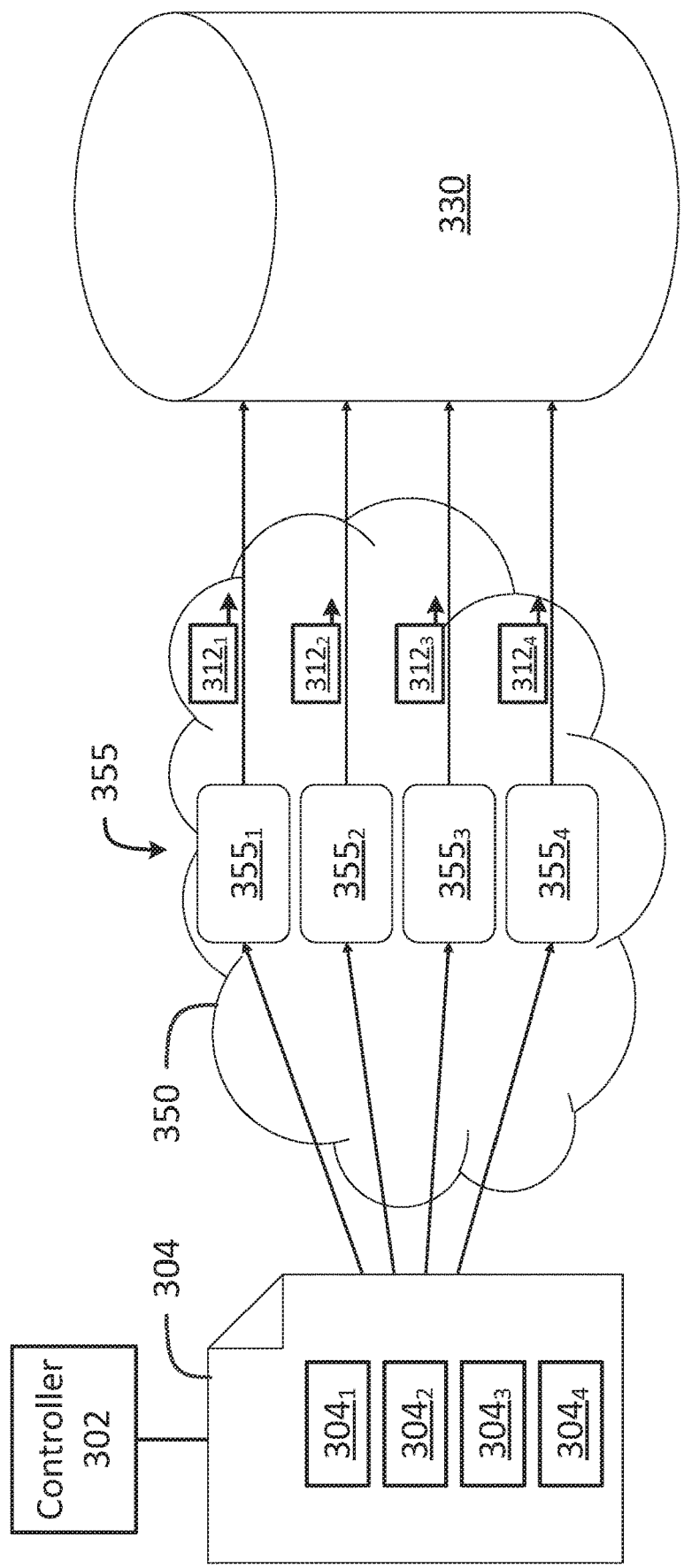
FIG. 5B illustrates an example reference list processing approach for the ALPR of FIG. 3B.

With additional reference to FIG. 5B, in some embodiments the ALPR system 150 is configured for processing multiple reference lists 304 in parallel, similarly to the way by which the ALPR system 150 processes the search requests 322 in parallel. the ALPR system 150 may be provided with multiple reference lists 304 in parallel by the controller 302. Alternatively, the reference list 304 may be subdivided into multiple reference sub-lists, illustrated here as $304_1$-$304_4$ (though it should be noted that the reference list 304 may be subdivided into any suitable number of reference sub-lists). The request handler 355 may instantiate a plurality of request handling elements $355_1$-$355_4$, which are each assigned a respective one of the reference sub-lists $304_1$-$304_4$ for processing. Each of the request handling elements $355_1$-$355_4$ may instantiate a respective transformation module 310 to apply one or more transformation rules to produce augmented reference sub-lists $312_1$-$312_4$, which may be stored together in the data store 330 (e.g., in a common augmented reference list 312), or may be stored separately within the data store 330. The different reference lists or reference sub-lists $304_1$-$304_4$ may be associated with different jurisdictions, different types of vehicles 102, or the like. In some example implementations, the ALPR 150 may be tasked with performing licence plate matching using one or more reference lists 304 which include of millions of licence plate identifiers 212. In some such example implementations, the parallelization of the application of the transformation rule(s) by the request handling elements $355_1$-$355_4$ may result in substantially reduced processing time.

Figure 6:
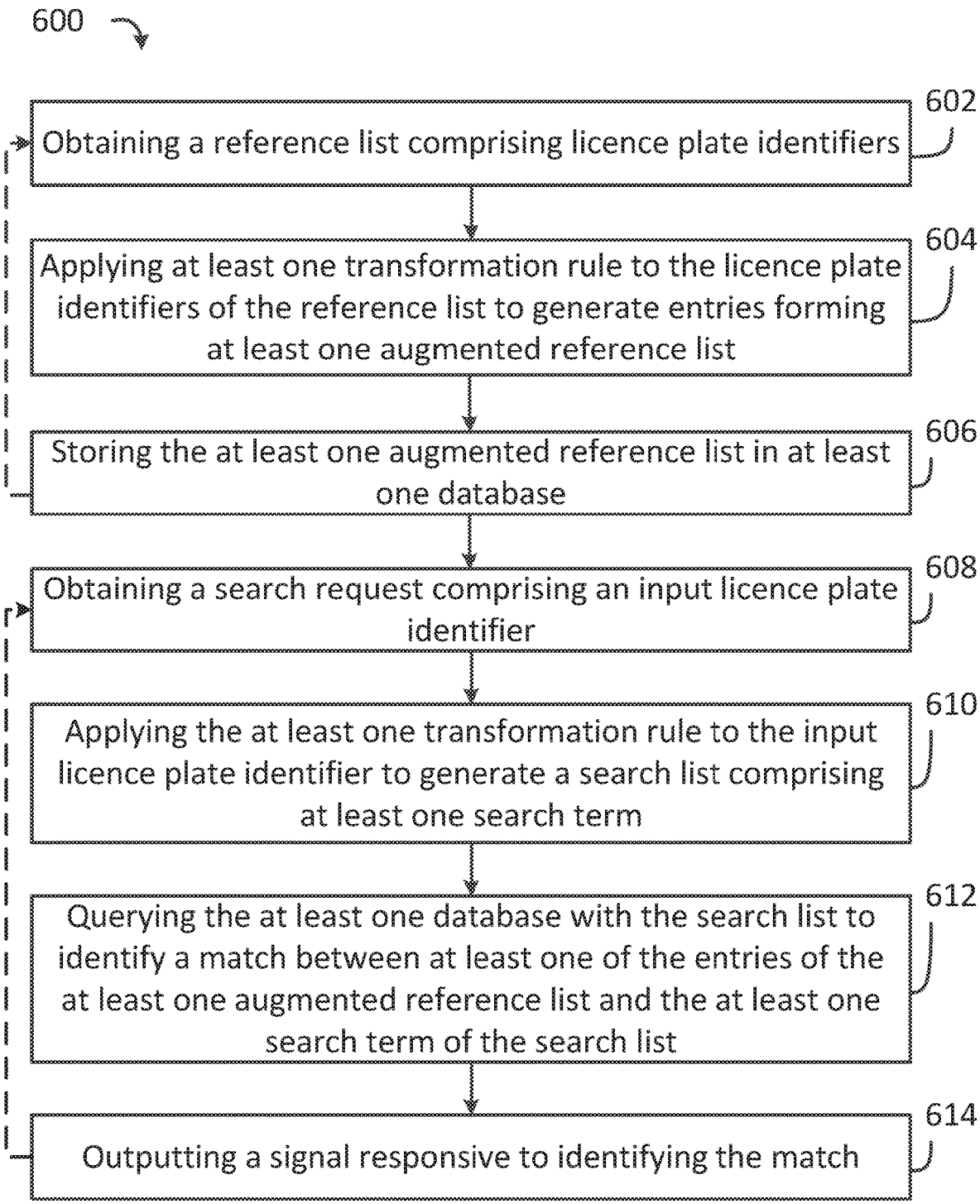
FIG. 6 illustrates a flowchart of an example method for licence plate matching.

With reference to FIG. 6, there is illustrated a method 600 for performing licence plate matching. The method 600 may be performed, in whole or in part, by the ALPR system 150 described hereinabove. Any reference to the scenarios, embodiments, and/or examples described in relation to FIGS. 1 to 5A-B in explanation of the method 600 is provided for example purposes, and the operating environment for the performance of the method 600 may vary depending on practical implementations. Any aspects of the scenarios, embodiments, and/or examples described in relation to FIGS. 1 to 5A-B may be incorporated into the method 600, where applicable to do so.

At step 602, the method 600 comprises obtaining a reference list, for instance the reference list 304, which comprises one or more licence plate identifiers. The reference list 304 may take any suitable format, and the licence plate identifiers can be stored within the reference list 304 in any suitable fashion. In some embodiments, a plurality of reference lists are obtained at any given time, for instance from the controller 302.

At step 604, the method 600 comprises applying at least one transformation rule to the licence plate identifiers of the reference list 304. The transformation rule(s) are applied by the transformation module 310, which generates entries to form at least one augmented reference list, for instance the augmented reference list 312. The transformation module 310 may apply any suitable number of transformation rules, including multiple transformation rules in succession. In some cases, the transformation rules applied to the licence plate identifiers of the reference list 304 are part of a predetermined set of transformation rules, which may be selected for application by the transformation module 310 to the licence plate identifiers of the reference list 304 based on various criteria. For instance, the jurisdiction of the licence plate identifiers of the reference list 304 may dictate that a particular set of transformation rules be applied by the transformation module 310.

For example, the transformation rules include generating subset entries by removing one or more characters from the licence plate identifiers 212. In another example, the transformation rules include replacing predetermined confusable characters with associated substitute characters. In some cases, the transformation module 310 can apply both the confusable character replacement rule and the subset entry generation rule in succession. Other approaches are also considered.

At step 606, the method 600 comprises storing the at least one augmented reference list 312 in at least one database, for instance the data store 330. The data store 330 may implement any suitable type of data structuring or other data storage approach for storing therein the augmented reference list(s) 312. In some embodiments, the augmented reference list 312 may be sorted as part of the storage in the data store 330, which may sort the entries of the augmented reference list 312 in any suitable order, for instance to facilitate later querying of the data store 330. In some embodiments, the augmented reference list 312 may also include metadata associated with the licence plate identifiers 212 of the reference list 304, for instance the original licence plate identifiers 212, a colour, make, and/or model of the associated vehicle 102, a jurisdiction of the licence plate 210, or the like.

At step 608, the method 600 comprises obtaining a search request, for instance the search request 322 from the camera 110, which comprises an input licence plate identifier, for instance the licence plate identifier 212. The search request 322 may include various information, including one or more images captured by the camera 110, a textual string of the licence plate identifier 212, information about the vehicle 102 associated with the licence plate identifier 212, or the like.

At step 610, the method 600 comprises applying the at least one transformation rule to the input licence plate identifier 212 to generate a search list, for instance the search list 314, comprising at least one search term. The transformation rule(s) applied in step 610 is (or are) the same transformation rule(s) applied to the reference list 304 in step 604. In this fashion, searching of the data store 330 is performed within a common search space shared by the augmented reference list 312 and the search list 314. In embodiments in which the transformation module 310 applies a predetermined set of transformation rules to the reference list 304, the transformation module 310 applies the same set of transformation rules to the licence plate identifier 212 of the search request 322.

At step 612, the method 600 comprises querying the at least one database (in this example, the data store 330) with the search list 314 to identify a match between at least one of the entries of the at least one augmented reference list 312 and the at least one search term of the search list 314. The querying and the identification of any matches between the entries of the augmented reference list 312 and the search terms of the search list 314 may be performed using any suitable querying and matching techniques. In some embodiments in which the augmented reference list 312 is sorted in a particular manner, the manner in which the querying of the data store 330 is performed may be adjusted based on the sorting of the augmented reference list 312. In some embodiments, the search list 314 may be subdivided into multiple sub-lists, which are used to query the data store 330 in parallel, which may be performed substantially concurrently. In embodiments in which the entries of the augmented reference list 312 and the search terms in the search list 314 are encrypted, the querying may occur with the encrypted search list to identify a match between at least one of the encrypted entries of an encrypted augmented reference list. For instance, matching between encrypted search terms and encrypted entries may be performed when the augmented reference list 312 and the search list 314 are encrypted using homomorphic encryption.

At step 614, the method 600 comprises outputting a signal responsive to identifying the match at step 612, for instance the query results 332. The query results 332 may include a list of matches identified between the search terms of the search list 314 and the entries of the augmented reference list 312, In some cases, the query results 332 may additionally include an identification of the transformation rules applied by the transformation module 310 for the matches in the query results 332. In some cases, the query results 332 may additionally include information originally provided with the search request 332, for instance images captured by the camera 110.

The signal may be output by the ALPR system 150, for instance to the controller 302, or to another element external to the ALPR system 150. In some embodiments, the signal may cause the query results 332 to be presented via one or more display devices, which may include one or more screens or the like. In some other embodiments, the signal may cause the query results 322 to be stored in an external data store, for instance the database 340. Other uses for the signal output at step 614 are also considered.

In some embodiments, certain steps of the method 600 may be repeated. For example, the method 600 may return to step 602 following step 606 in order to produce a new augmented reference list 312 for a subsequently-obtained reference list 304, or to incorporate newly-generated entries into the exiting augmented reference list 312. In another example, steps 608 through 614 can be performed multiple times, including substantially concurrently, for each new search request 322 obtained from the camera 110.

While various embodiments and examples are described herein where a match is identified between at least one of the entries of the augmented reference list(s) 312 and the at least one search term of the search list 314, the embodiments and examples are applicable to queries performed within the data store 330 for possible or likely candidates without necessarily corresponding to a match. For instance, the database(s) 330 may be queried with the search list 314 to identify at least one of the entries of the augmented reference list(s) 312 that exhibits a degree of similarity (e.g., one or more similar characters) to that of the at least one search term of the search list 314. A confidence score may be computed for each of the entries of the augmented reference list(s) 312 that has a degree of similarity (e.g., one or more similar characters) to that of the at least one search term of the search list 314, in which the confidence score reflects how similar a given entry in the augmented reference list 312 is to a given search term of the search list 314. The entries of the augmented reference list(s) 312 that exhibit a degree of similarity (e.g., one or more similar characters) to that the at least one search term of the search list 314 may be output, for instance to the controller 302, and in some cases the confidence score may also be output.

Figure 7:
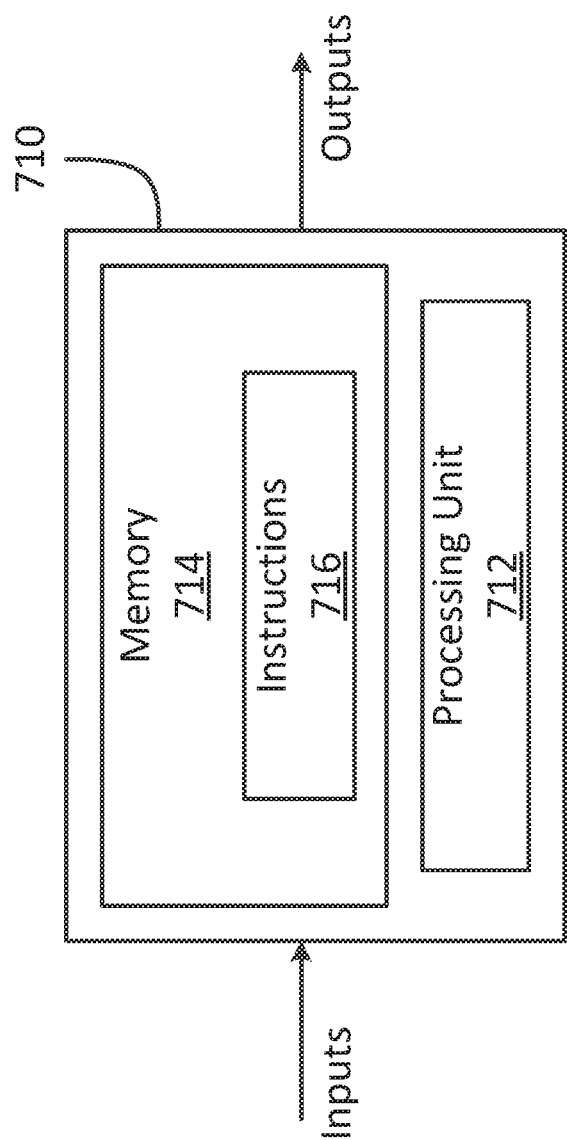
FIG. 7 illustrates a block diagram of an example computing system for implementing, inter alia, the method of FIG. 5.

With reference to FIG. 7, there is illustrated a schematic diagram of an example computing device 710. As depicted, the computing device 710 includes at least one processing unit 712, a memory 714, and program instructions 716 stored within the memory 714. It should be noted that the computing device 710 may additionally include one or more input/output interfaces and one or more network interfaces. The method 600 may be performed by one or more computing devices 710. The method 600 may be performed by at least one processing unit 712. The controller 320 may be implemented with one or more computing devices 710. The ALPR system 150 may be implemented with one or more computing devices 710.

The processing unit 712 may be, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, a programmable read-only memory (PROM), other suitably programmed or programmable logic circuits, or any combination thereof.

The memory 714 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., storage devices) suitable for retrievably storing machine-readable instructions 716 executable by processing unit 712. Memory 714 may be used to store one or more databases.

The I/O interface(s) of the computing device 710 provide interconnection functionality to one or more input devices, such as a keyboard, mouse, camera, touch screen and a microphone, or with one or more output devices such as a display device and a speaker. The display device may be a cathode ray tube display device, a light emitting diode (LED) display device, a liquid crystal display (LCD) display device, a touch screen, or any other suitable display device.

The network interface(s) of the computing device 710 enable the computing device 710 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN digital subscriber line (DSL), coaxial cable, fiber optics, satellite, mobile, wireless (e.g. W-Fi, WiMAX), SS7 signaling network, fixed line, local area network, wide area network, and others, including any combination of these.

The computing device 710 is operable to register and authenticate users (using a login, unique identifier, and password for example) prior to providing access to applications, a local network, network resources, other networks and network security devices. The computing devices 710 may serve one user or multiple users.

For simplicity, only one computing device 710 is shown, but the ALPR system 150 and/or the controller 302 may include multiple computing devices 710. The computing devices 710 may be the same or different types of devices. The components of the computing device 710 may be connected in various ways including directly coupled, indirectly coupled via a network, and distributed over a wide geographic area and connected via a network (which may be referred to as "cloud computing").

For example, and without limitation, the computing device 710 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and/or implementing the systems described herein. The cloud-computing environment described herein may comprise one or more of the computing devices 710.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

The invention claimed is:

1. A method for performing licence plate matching, comprising:

obtaining a reference list comprising licence plate identifiers;

applying at least one transformation rule to the licence plate identifiers of the reference list to generate entries forming at least one augmented reference list and storing the at least one augmented reference list in at least one database, wherein applying the at least one transformation rule to the license plate identifiers of the reference list comprises, for each of the license plate identifiers of the reference list:

generating a subset entry by removing a first character from each licence plate identifier, each subset entry having fewer characters than a respective license plate identifier; and generating at least one additional subset entry by removing a second character from each licence plate identifier, the second character at a different position within each licence plate identifier than that of the first character, each of the at least one additional subset entry having fewer characters than the respective license plate identifier;

wherein the subset entry and the at least one additional subset entry form part of the at least one augmented reference list;

obtaining a search request comprising an input licence plate identifier;

applying the at least one transformation rule to the input licence plate identifier to generate a search list comprising at least one search term;

querying the at least one database with the search list to identify a match between at least one of the entries of the at least one augmented reference list and the at least one search term of the search list; and outputting search results including the match responsive to identifying the match.

2. The method of claim 1, wherein generating the at least one additional subset entry by removing the second character from each licence plate identifier is repeated for each different position of the second character within each licence plate identifier.

3. The method of claim 1, wherein generating the subset entry further comprises removing a first group of characters from the licence plate identifier, each subset entry having multiple fewer characters than the respective license plate identifier; and wherein generating the at least one additional subset entry comprises removing a second group of characters from the licence plate identifier, the second group of characters different from the first group of characters, each of the at least one additional subset entry having multiple fewer characters than the respective license plate identifier.

4. The method of claim 3, wherein removing the first group of characters from the license plate identifier comprises removing a first set of contiguous characters, and wherein removing the second group of characters from the license plate identifier comprises removing a second set of contiguous characters, the second set of contiguous characters including at least some characters absent in the first set of contiguous characters.

5. The method of claim 3, wherein removing the second group of characters from the license plate identifier comprises removing at least one character present in the first group of characters and at least one other character absent in the first group of characters.

6. The method of claim 1, wherein applying the at least one transformation rule to the licence plate identifiers of the reference list to generate entries further comprises replacing confusable characters in the licence plate identifiers with associated substitute characters.

7. The method of claim 6, wherein replacing the confusable characters in the licence plate identifiers with the associated substitute characters further comprises selecting a set of the confusable characters and the associated substitute characters based on a language of the licence plate identifiers and/or based on a jurisdiction of the licence plate identifiers.

8. The method of claim 1, wherein storing the at least one augmented reference list in the at least one database comprises sorting the entries within the at least one augmented reference list.

9. The method of claim 1, wherein storing the at least one augmented reference list in the at least one database comprises linking the entries of the at least one augmented reference list with metadata.

10. The method of claim 9, wherein linking the entries of the at least one augmented reference list with metadata comprises linking each of the entries with a respective one of the licence plate identifiers used to generate the entries.

11. The method of claim 9, wherein linking the entries of the at least one augmented reference list with metadata comprises linking each of the entries with vehicle information of a vehicle associated with a respective one of the licence plate identifiers used to generate the entries.

12. The method of claim 9, wherein linking the entries of the at least one augmented reference list with metadata comprises linking each of the entries with a jurisdiction identifier associated with a respective one of the licence plate identifiers used to generate the entries.

13. The method of claim 1, wherein outputting the search results responsive to identifying the match comprises outputting a licence plate image associated with the request.

14. The method of claim 13, wherein outputting the search results responsive to identifying the match comprises outputting a contextual image associated with the request, the contextual image comprising the licence plate image.

15. The method of claim 1, wherein storing the at least one augmented reference list in the at least one database comprises incorporating the licence plate identifiers of the reference list as part of the at least one augmented reference list, and wherein the search list comprises the input licence plate identifier.

16. The method of claim 15, wherein outputting the search results responsive to identifying the match comprises outputting a first indication responsive to identifying a first match between the input licence plate identifier and one of the licence plate identifiers; and outputting a second indication responsive to identifying a second match between one of the at least one search terms and one of the entries of the at least one augmented reference list.

17. The method of claim 1, further comprising:

obtaining a supplemental reference list comprising at least one supplemental licence plate identifier;

applying the at least one transformation rule to the at least one supplemental licence plate identifier to generate at least one supplemental entry; and storing the at least one supplemental entry in the at least one database as part of the at least one augmented reference list.

18. The method of claim 1, wherein storing the at least one augmented reference list in the at least one database comprises storing the at least one augmented reference list in a cloud repository.

19. The method of claim 18, wherein querying the at least one database with the search list comprises:
   splitting the search list into a plurality of search sub-lists, each search sub-list comprising at least one of the at least one search term; and
   querying the cloud repository with the plurality of search sub-lists in parallel.

20. A system for performing licence plate matching, comprising:
   at least one processing unit; and
   at least one non-transitory computer-readable medium having stored thereon program instructions executable by the at least one processing unit for:
      obtaining a reference list comprising licence plate identifiers;
      applying at least one transformation rule to the licence plate identifiers of the reference list to generate entries forming at least one augmented reference list and storing the at least one augmented reference list in at least one database, wherein applying the at least one transformation rule to the license plate identifiers of the reference list comprises, for each of the license plate identifiers of the reference list:
         generating a subset entry by removing a first character from each licence plate identifier, each subset entry having fewer characters than a respective license plate identifier; and
         generating at least one additional subset entry by removing a second character from each licence plate identifier, the second character at a different position within each licence plate identifier than that of the first character, each of the at least one additional subset entry having fewer characters than the respective license plate identifier;
      wherein the subset entry and the at least one additional subset entry form part of the at least one augmented reference list;
      obtaining a search request comprising an input licence plate identifier;
      applying the at least one transformation rule to the input licence plate identifier to generate a search list comprising at least one search term;
      querying the at least one database with the search list to identify a match between at least one of the entries of the at least one augmented reference list and the at least one search term of the search list; and
      outputting search results including the match responsive to identifying the match.

* * * * *